United States Patent
Conover et al.

(10) Patent No.: US 9,838,445 B2
(45) Date of Patent: Dec. 5, 2017

(54) QUANTIFYING SOCIAL CAPITAL

(71) Applicant: LinkedIn Corporation, Mountain View, CA (US)

(72) Inventors: Michael David Conover, San Francisco, CA (US); Mathieu Bastian, San Francisco, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 618 days.

(21) Appl. No.: 14/529,068

(22) Filed: Oct. 30, 2014

(65) Prior Publication Data
US 2016/0124956 A1    May 5, 2016

(51) Int. Cl.
G06F 7/00 (2006.01)
G06F 17/30 (2006.01)
H04L 29/06 (2006.01)
G06Q 50/00 (2012.01)

(52) U.S. Cl.
CPC ...... *H04L 65/403* (2013.01); *G06F 17/30958* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 9,613,341 | B2* | 4/2017 | Shivakumar | G06Q 10/101 |
| 2009/0164624 | A1* | 6/2009 | Metcalf | G06F 17/30861 |
| | | | | 709/224 |
| 2012/0150754 | A1* | 6/2012 | Belady | G06Q 10/30 |
| | | | | 705/308 |
| 2013/0066673 | A1* | 3/2013 | Rose | G06F 3/048 |
| | | | | 705/7.28 |
| 2013/0291098 | A1* | 10/2013 | Chung | G06F 21/50 |
| | | | | 726/21 |
| 2016/0117355 | A1* | 4/2016 | Krishnamurthy | G06F 17/30345 |
| | | | | 707/749 |

* cited by examiner

*Primary Examiner* — Jau-Shya Meng
(74) *Attorney, Agent, or Firm* — Schwegman Lundberg & Woessner, P.A.

(57) ABSTRACT

For each of a group of nodes including a node corresponding to a first member and a plurality of nodes corresponding to members with which the first member is directly connected in a social graph, a plurality of reputation scores may be calculated for a node in the social graph, and the plurality of reputation scores for the node may be averaged into an importance score for the node. A keyness score for each of the plurality of nodes corresponding to members with which the first member is directly connected in the social graph can be calculated, the keyness score for each of the plurality of nodes being based on a connection strength for a connection between the node and the node corresponding to the first member and based on the importance score for the node. The keyness scores may be selected, averaged, and saved as a social capital score.

18 Claims, 7 Drawing Sheets

QUANTIFYING SOCIAL CAPITAL

TECHNICAL FIELD

The present disclosure generally relates to information retrieval and processing. More specifically, the present disclosure relates to methods, systems and computer program products for quantifying social capital.

BACKGROUND

Online social network services provide members with a mechanism for defining, and memorializing in a digital format, representations of themselves (e.g., member profiles) and their relationships with other people. This digital representation of relationships between members is frequently referred to as a social graph. Many social network services utilize a social graph to facilitate electronic communications and the sharing of information between its members. For instance, the relationship between two members of a social network service, as defined in the social graph of the social network service, may determine the access and sharing privileges that exist between the two members. As such, the social graph in use by a social network service may determine the manner in which two members of the social network service can interact with one another via the various communication and sharing mechanisms supported by the social network service.

One issue that arises in such social network services is that members often want to know the "importance" of another member of the social network service. How "important" a particular member is may impact, for example, whether other members wish to attempt to establish a social graph connection with the member and/or reach out in other ways (e.g., send an email) to the member. One commonly used mechanism to gauge "importance" of a member is to simply total up the number of connections the member has to other members, under the presumption that the more connections the member has, the more important the member must be. This gauge of "importance," however, has a high failure rate, as the collecting of connections in a social network has become a game of sorts for a number of members, who seem keen on adding connections no matter how weak of a relationship they have with other members and no matter the relevance of the member on the other end of the relationship to the member's own business or needs.

DESCRIPTION OF THE DRAWINGS

Some embodiments of the technology are illustrated by way of example and not limitation in the figures of the accompanying drawings.

DETAILED DESCRIPTION

Overview

The present disclosure describes, among other things, methods, systems, and computer program products, which individually provide functionality for quantifying social capital for members in a social network service. In the following description, for purposes of explanation, numerous specific details are set forth in order to provide a thorough understanding of the various aspects of different embodiments of the present invention. It will be evident, however, to one skilled in the art, that the present inventive subject matter may be practiced without all of the specific details.

Example embodiments may include systems and methods to generate recommendations based on data derived from social graph data. One type of recommendation that may be generated by example embodiments is a connection recommendation. A connection recommendation may be a recommendation that attempts to link different nodes (e.g., member profiles) in the social graph Some social network services aim to enable friends and family to communicate and share with one another, while others are specifically directed to business members with a goal of facilitating the establishment of professional networks and the sharing of business information. For purposes of the present disclosure, the terms "social network" and "social network service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

Example embodiments may provide many practical applications. For example, some systems and methods may leverage information associated with member connections between members of a social network service in order to provide targeted, actionable information to the members, in order to encourage and/or prompt the members to seek additional connections within the social network service, encourage outside members to join the social network service, and other benefits.

Other benefits and aspects of the inventive subject matter will be readily apparent from the description of the figures that follows.

Suitable System

Figure 1:
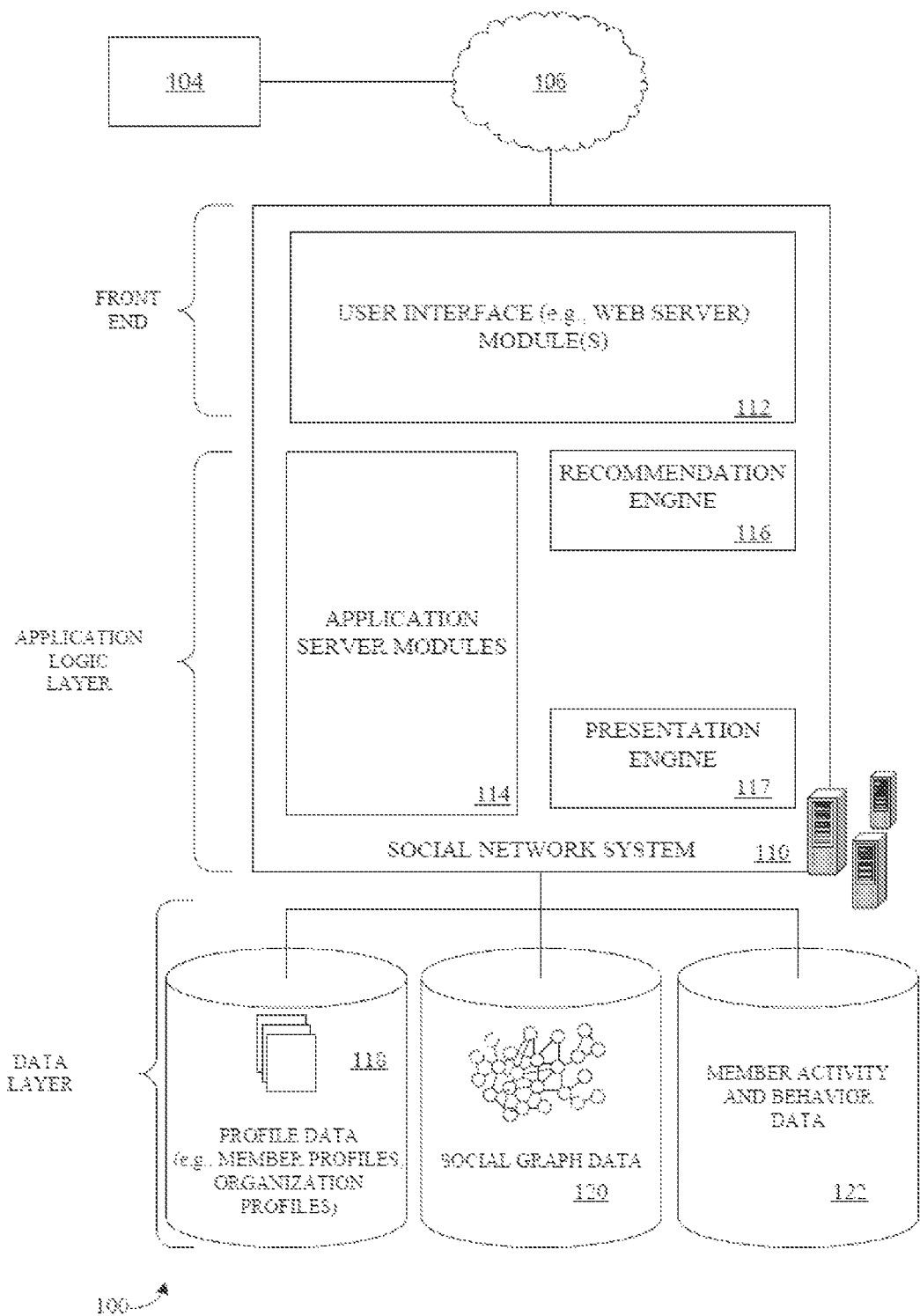
FIG. 1 is a block diagram illustrating various components or functional modules of a social network service, consistent with some embodiments.

FIG. 1 is a block diagram illustrating various components or functional modules of a social network service 100, consistent with some embodiments. The modules, systems, and/or engines shown in FIG. 1 represent a set of executable software instructions and the corresponding hardware (e.g., memory and processor) for executing the instructions. However, one skilled in the art will readily recognize that various additional functional modules and engines may be used with the social network service 100 to facilitate additional functionality that is not specifically described herein. Furthermore, the various functional modules and engines depicted in FIG. 1 may reside on a single server computer, or may be distributed across several server computers in various arrangements As shown in FIG. 1, a front end layer of the social network system 110 includes a member interface module (e.g., a web server) 112, which receives requests from various client-computing devices, such as a source member device 104, over a network 106, and communicates appropriate responses to the requesting client devices. For example, the member interface module(s) 112 may receive requests in the form of Hypertext Transport Protocol (HTTP) requests, or other web-based, application programming interface (API) requests. The source member device 104 may be any suitable computing device—such as a personal computer, laptop, cellular phone, smart phone, computing tablet, and the like—executing conventional web browser applications, or applications that have been developed for a specific platform (e.g., operating system, computer system, or some combination thereof).

The network 106 may be any communications network utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, wireless data networks (e.g., Wi-Fi® and WiMax® networks), and so on.

The application logic layer of the social network system 110 includes various application server modules 114, which, in conjunction with the member interface module(s) 112, generates various member interfaces (e.g., web pages) with data retrieved from various data sources in the data layer. With some embodiments, individual application server modules 114 are used to implement the functionality associated with various services and features of the social network service 100. For instance, the ability to generate connection recommendations for a source member may be service (or services) implemented in independent application server modules 114. Similarly, a variety of other applications or services that are made available to members of the social network service 100 will be embodied in their own application server modules 114. For example, with some embodiments, the social network system 110 includes modules that may individually or in combination provide connection recommendations, such as a recommendation engine 116 and a presentation engine 117. The recommendation engine 116 may be a computer-implemented module configured to generate member profile recommendations. Example embodiments may use a variety of information to generate the connection recommendations, such as data derived from member connections in a social graph.

The presentation engine 117 may be a computer-implemented module configured to generate member interface elements for interacting with the member profile recommendations. For instance, the presentation engine 117 may generate data and logic that, when executed on by one or more processors, causes a client device to display a member interface that depicts the member profile recommendation. In some cases, the presentation engine 117 may use the member profile recommendation to generate member interface elements that may cause the social network service 100 to create a member connection (or initiate the process for forming a member connection) between the source member profile and the member profile represented by the member profile recommendation.

As shown in FIG. 1, the data layer includes several databases, such as a database 118 for storing profile data. Consistent with some embodiments, when a person initially registers to become a member of the social network service 100, the person will be prompted to provide some personal information, such as his or her name, age (e.g., birth date), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database with reference number 118.

Once registered, a member may invite other members, or be invited by other members, to connect via the social network service 100. A "member connection," or simply "connection," may necessitate a bi-lateral agreement by the members, such that both members acknowledge the establishment of the connection. It is to be appreciated that members may "connect" with entities other than member profiles, such as companies, groups, or any other suitable cohort. The various associations and relationships that the members establish with other members, or with other entities represented by date stored in the database 118, are stored and maintained within the social graph, shown in FIG. 1 with reference number 120.

The social network service 100 may provide a broad range of other applications and services that allow members the opportunity to share and receive information, often customized to the interests of the member. For example, with some embodiments, the social network service 100 may include a photo sharing application that allows members to upload and share photos with other members. With some embodiments, members may be able to self-organize into groups, or interest groups, organized around a subject matter or topic of interest. With some embodiments, the social network service 100 may host various job listings providing details of job openings with various organizations.

As members interact with the various applications, services and content made available via the social network service 100, the members' behavior (e.g., content (e.g., profiles) viewed, links selected, messages sent, etc.) may be monitored and information concerning the member's behavior may be stored, for example, as indicated in FIG. 1 by the database with reference number 122. One type of behavior data that may be stored in database 122 is member activity between a member having one member profile with another member having another member profile. As described above, examples of member activities include activities where one member: visits a profile page of a member, messages the member, saves the member in a contact list, introduces the member to another member profile.

Example embodiments may use workflows (e.g., Hadoop® workflows) to implement some portions of the recommendation engine 116. These workflows may execute feature extraction tasks—signals such as the recency of a member connection, company and school overlap, geographical distance, similar ages, and many others—followed by a model application step. The resulting data model of these workflows may be a key-value store where the key is a member profile identifier and the value is a list of member ID, common connection score pairs.

Example of Social Graph Data

Figure 2:
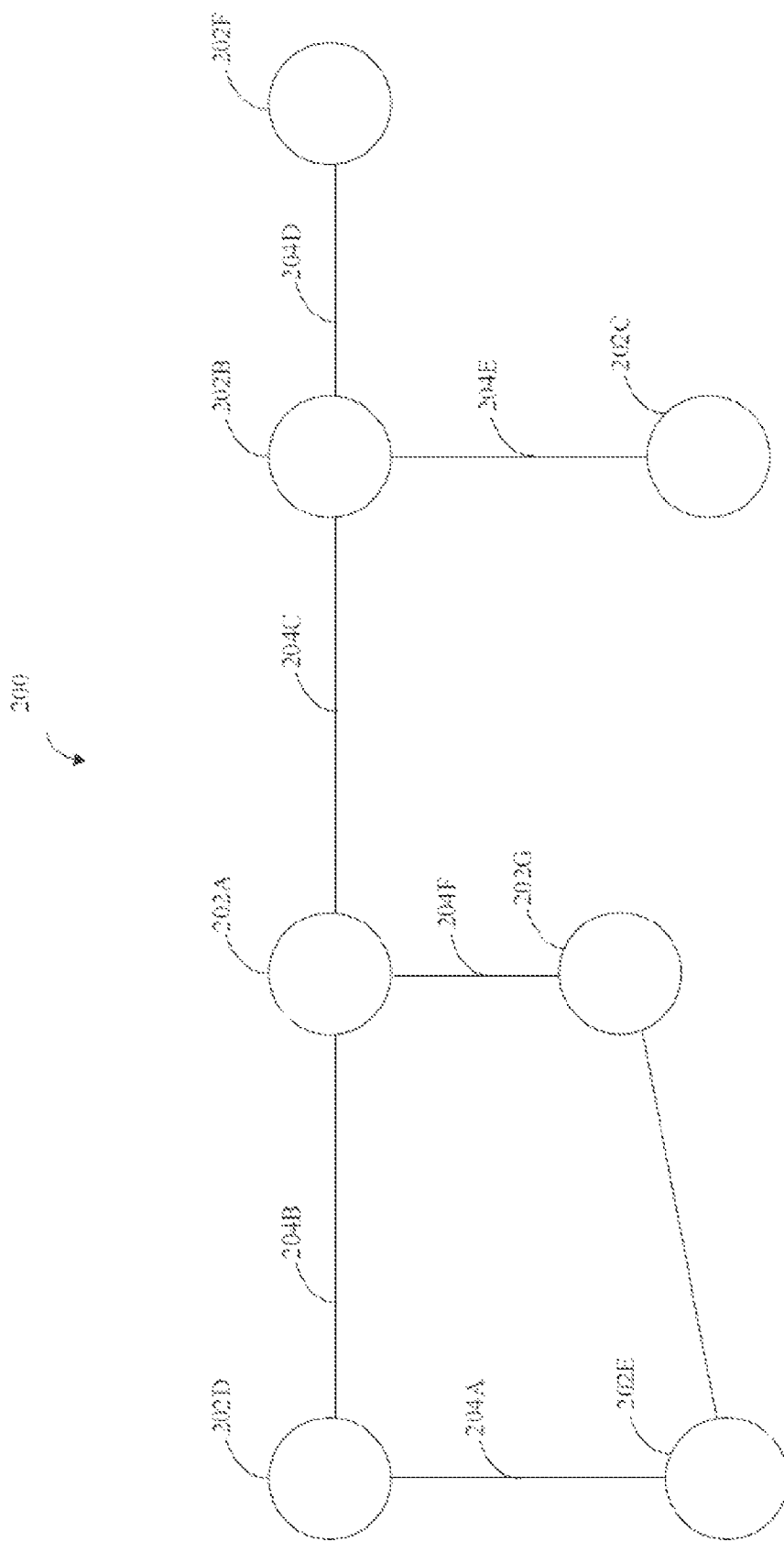
FIG. 2 is a data diagram illustrating an example of a social graph that includes member profiles connected to each other through member connections, according to an example embodiment.

As discussed above, the recommendation engine 116 may be configured to process data from a social graph to generate member profile recommendations. Accordingly, a social graph is now discussed in greater detail. FIG. 2 is a data diagram illustrating an example of a social graph 200 that includes member profiles 202A-G connected to each other through member connections 204A-F, according to an example embodiment. The member profiles 202A-G, commonly referred to as nodes of the social graph 200, may each represent a member profile of a member of the social network service 100. For clarity of description, the social graph 200 may be the social graph for the member profile 202A, also referred herein as a "source member profile."

The member connections 204A-F may be data or logic that represents a member connection between two member profiles. By way of example and not limitation, a member connection may represent: a member profile accepting a connection request or invite from another member profile; a member profile sending a member connection request or invite to another member; a member importing information from an address book or other database or online location that includes information identifying members or people that are associated with the member; a member following another member; a member viewing the member profile of another member or viewing information identifying potential connections, such as potential connections inferred and/or suggested to the member by the social network service 100, as well as endorsements or other links between users, and so on. In some embodiments, a member connection can be unidirectional (e.g., formed by following or subscribing) or bidirectional (e.g., formed by "connecting" or "friending"). It is also not a limitation of this description that two member connections that are deemed "connections" for the purposes of this disclosure are not necessarily connected in real life, but that can be the case.

With respect to a particular member profile, a member connection may be a direct member connection or an indirect member connection. When a member connection of a social graph connects two member profiles, those two member profiles may be referred to as a first-degree connections and the member connection between the two members may be referred to as a first-degree member connection. To illustrate, the member profile 202A is first-degree connections with member profiles 202B and 202D because the member profile 202A is connected to member profile 202B via the member connection 204C, and the member profile 202A is connected to member profile 202D via the member connection 204B.

In comparison to a direct connection, an indirect connection is where two member profiles lack a first-degree member connection but a path between the two member profiles exists in the social graph. The number of edges (e.g., member connections) in a minimum path that connects a member profile to another profile is considered the degree of the connection between the member profiles. For example, FIG. 2 shows that the member profiles 202C and 202F are second-degree connections to the member profile 202A because the minimum path from 202A to 202C includes two member connections (204C and 204E), and the minimum path from 202A to 202F also includes two member connections (204C and 204D). For the same reason, it should be appreciated that member profile 202E is also a second-degree connection. The limit on the number of degrees of separation for member connections that a member profile is allowed is typically dictated by the restrictions and policies implemented by the social networking service 100.

Thus, a social graph (e.g., the member profiles and connection activities thereof) may be a data structure that illustrates how a member profile (e.g., the source member profile 202A) is "connected" to other member profiles of the social network service 100.

Figure 3:
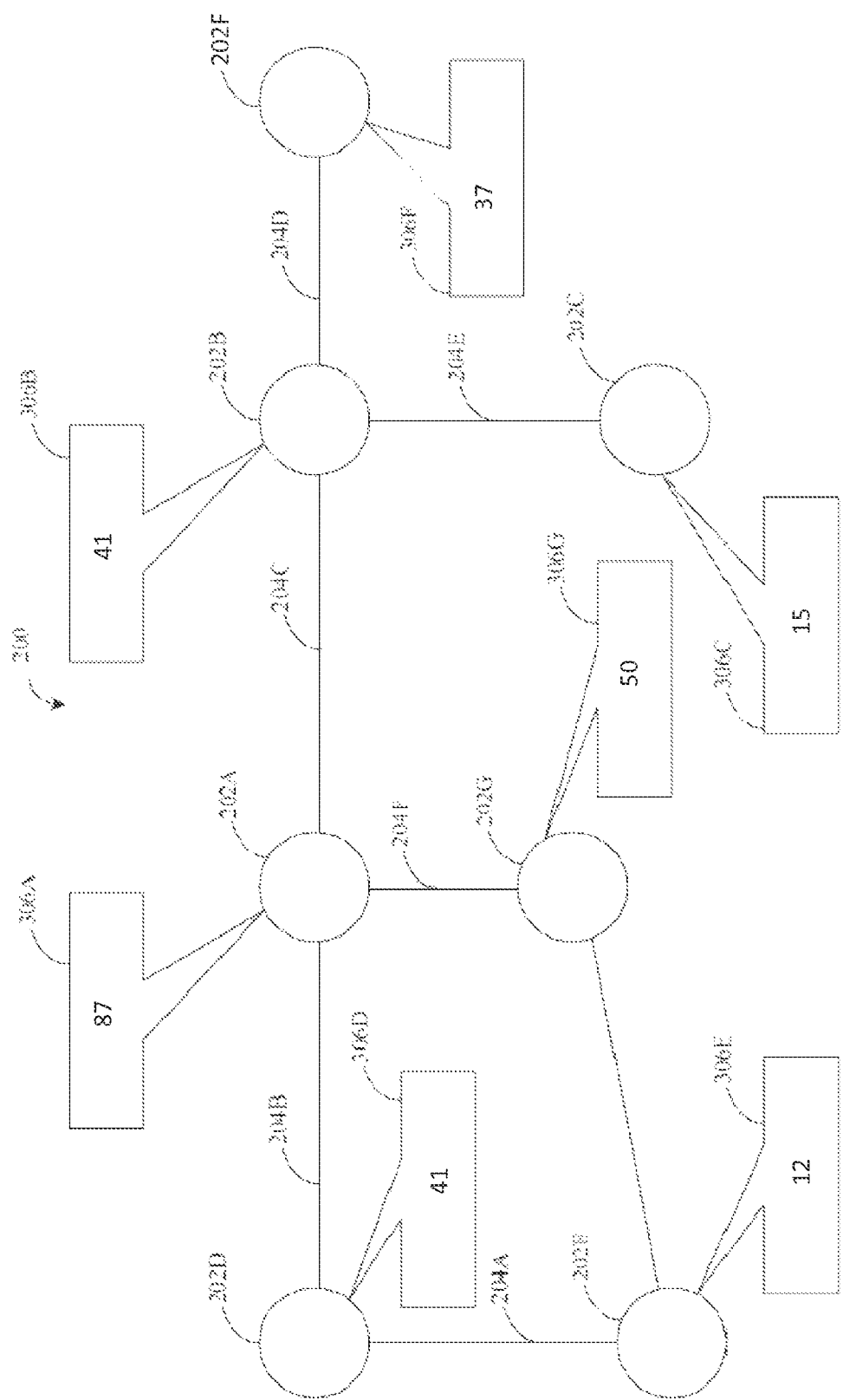
FIG. 3 is a data diagram illustrating social capital data that may be calculated from the social graph, according to an example embodiment.

Some embodiments of the social graph 200 may include data in addition to the data representing connection between member profiles, as shown in FIG. 2. For example, FIG. 3 is a data diagram illustrating social capital data that may be calculated from the social graph 200, according to an example embodiment. FIG. 3 shows that the social graph 200 may include social capital data 306A-G that corresponds to the member connections 204A-F. "Social capital," as used herein, may include any suitable data that represents a measurement of how "important" a particular member is in the context of a social graph. In this example embodiment, the social capital for a member is a general level of importance such that it is stored without further detail with the member's profile. In other words, in this embodiment, each member is assigned an overall social capital score which applies no matter the context of its use.

In other example embodiments, a particular member may be assigned (or have calculated for him or her) a social capital score that is particular to how the score will be used. For example, a member may have one social capital score in the context of his or her career, and a separate social capital score in the context of his or her personal life. In another example embodiment, a member may have multiple social capital scores for different aspects of his or her career, such as, in the case of a patent attorney, one score for the field of science and another score for the field of law. It should be noted that the social capital score is different and distinct from a reputation score that may be assigned to one or more skills of the member. The concept of reputation scores will be described in more detail below.

For clarity of description and illustration, it is to be appreciated that the social graph 200 shown in FIGS. 2 and 3 is simplified in that these figures do not show all the member connections and member profiles in the social graph.

Reputation Scores

Each member of an on-line social network may be represented by a member profile (also referred to as a profile of a member or simply a profile). A member profile may be associated with social links that indicate that member's connection to other members of the social network. A member profile may also include or be associated with comments or endorsements from other members of the on-line social network, with links to other network resources, such as, e.g., publications, etc. As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Reputation scores may be computed based on information obtained from trusted sources, such as patent databases, publications databases, or even enterprise contracts. Connections may be used to infer or extrapolate reputation scores of members that are connected to a member whose reputation score is known. For instance a member could be assigned a high score for their experience at a well-known company if 100 of their 150 connections have an overlap on their profile for working at the same company and 10 of them have confirmed email addresses. Members who are connected in the context of a social network may be termed each other's connections. Additionally, connections who are also reputable may be considered for inference or extrapolation. Furthermore, reputation scores may involve skills rather than organizations. If someone is curious about whether a person is reputable with regards to cloud computing, one could see how many reputable connections he or she has in the cloud computing industry.

The profile information of a social network member may include personal information such as, e.g., the name of the member, current and previous geographic location of the member, current and previous employment information of the member, information related to education of the member, information about professional accomplishments of the member, publications, patents, etc. The profile information of a social network member may also include information provided by the member's connections. Information provided by the member's connections may be, e.g., recommendations, endorsements and skills. The profile of a member may include several items or units of a profile (also termed profile units). For example one unit of a profile may contain information about the member's education, while another unit may contain information about the member's current and past employment.

According to one example embodiment, the data contained in and associated with a member profile may be examined and processed to generate a value that may be viewed as indicative of a reputation of the associated member. Such a value may be referred to as a reputation score and may be made available to other members of the on-line social network.

A reputation score may be indicative of the member's professional and/or academic reputation and may be represented by a numerical value, e.g., a number between 1 and 10. Another way to represent reputation may be utilizing a color scheme. For example, green may indicate "high confidence of the accuracy of the profile information," yellow may indicate "might need more checking," and gray may indicate "not known." A reputation score may also be associated with a confidence value. A confidence value may be calculated to represent the certainty level of the reputation score being an accurate representation of the member's professional reputation in the context of the social network.

In one example embodiment, in order to generate the reputation score for a member profile, the system for generating reputation scores may first define or select a profile unit that can be scored. Once defined, information associated with the profile unit is collected and provided to a score generator model. A score generator model may be viewed as a computer-implemented module that takes certain information as input, processes it by applying rules and/or machine learning techniques, and generates an output that can be utilized by other computer-implemented modules or stored in a repository for future access. Some examples of data that may be used to score a profile unit of a member include the following: (1) Confirmed email address of the member; (2) Connections of the member, whose respective profiles indicate the connections having worked at the same company as the member during the same time period; (3) Proportion of connections of the member that are associated with one specific company, as compared to the total number of connections of the member; and (4) Publications referenced in the profile of the member, where the name of the publication is found in a public database. Additional information includes the skills of a member, the number of times they are clicked on by other members searching for that company/skill, in addition to unit-agnostic attributes such as how many times someone arrives on the site after searching for their name, whether they have been mentioned in the news, etc.

A system for generating reputation scores for member profiles may be provided with a different score generator model for different units of a member profile (unit score models for generating unit scores), as well as with a separate score generator model for generating a score for the entire member profile (a combined reputation score model). A combined reputation score model, in one embodiment, may utilize the profile information of a member together with respective scores of various profile units to generate an overall reputation score of the member profile.

For example, a profile of a member may include information regarding the member's education and professional experience. The part of the profile that contains information regarding the member's education may be designated as a profile unit, for which a reputation score can be generated. Another profile unit, for which a reputation score may be generated, may be the part of the profile that contains information regarding the member's professional experience. Each of these two scores may be processed by respective score generator models. An associated model may analyze information contained in the profile unit related to the member's education and assign a higher or a lower score to this profile unit based, e.g., on the number and the quality of the members' degrees, on the number of years of college completed, etc. A different model may be used to evaluate the profile unit related to the member's professional experience and assign a higher or a lower score to this profile unit based, e.g., on the number of years in an industry, on the positions held by the member at various companies, etc. The reputation score of a member may also be affected by reputation scores of the member's connections and by any recommendations and endorsements provided by the member's connections, as well as by the completeness of the member's profile.

In one example embodiment, member profiles of certain members may be selected as so-called seed profiles. A seed profile is a profile of a member who is well known in their field of expertise, and whose credentials and professional accomplishments are well known and/or easily verifiable. The reputation scores of the seed profiles may be computed based on the profile information that can be verified as well based on the publically available information, such as, e.g., the publications and awards of the member represented by the seed profile. Additionally, information not available on the profile can be used, such as information that is generated by enterprise crowdsourcing, presence of a Wikipedia page corresponding to the person, etc. Once the information associated with a member represented by a seed profile is verified, the reputation score of the seed profile is associated with a high (or the highest) confidence value. A seed profile may also be tagged with an indication of it being a seed profile in that the information associated with this profile is to carry higher weight in determining reputation scores of other member profiles.

In generating a reputation score of a member profile, the system may utilize so-called association information related to a seed profile. Association information reflects association between a member profile and a seed profile. Association information may include the number of connections that a member profile has in common with a seed profile, recommendations or endorsements originated from a seed profile with respect to a member profile, recommendations or endorsements of a member profile by members represented by profiles that are connections of a seed profile, etc. For example, in one embodiment, a recommendation of a member profile by a member represented by a seed profile may be used to increase the reputation score of the member profile. The reputation score of a member profile may also be increased based on recommendations or endorsements by members who are common connections between the member profile and a seed profile, but in a lesser degree as compared to when the endorsement originates directly from a seed profile.

The profiles of the members of an on-line social network may differ significantly, e.g., in terms areas of professional pursuit, education, seniority in the field, as well as the completeness of the profile. For example, one member may be a CEO having decades of experience in the industry, while another member may be a student. In order to put all member profiles on equal footing, the scored member profiles can be normalized across all profiles in the on-line social network.

With reference to the present disclosure, a reputation score is assigned to a particular skill of a member, such that a member with multiple skills will have multiple reputation scores. These multiple reputation scores may be stored, for example, in a member/skill matrix. A member/skill matrix may be a data structure such that on one axis of the data structure may be members and on the other axis skills. Each member/skill pair may be assigned a reputation score as described above, or using another method for assigning reputation scores.

Example Methods of Quantifying Social Capital

As described herein, the recommendation engine 116 may perform various methods when generating member profile recommendations based on social capital scores derived from a social graph. Additionally the social capital can be utilized in other ways as will be described in more detail later. This current section describes various ways in which social capital may be quantified.

In an example embodiment, two mechanisms may be utilized to calculate social capital scores for members. The overall goal of each mechanism is to produce a high-level social capital score that applies across multiple skills. This process may involve assigning a single social capital score to each member/profile, although embodiments are also possible where multiple social capital scores can be applied to some or all of the members/profiles. This may include, as described earlier, circumstances where a member may have one career social capital score and a separate personal social capital score, or where a member has two broad areas of career having individual social capital scores.

Figure 4:
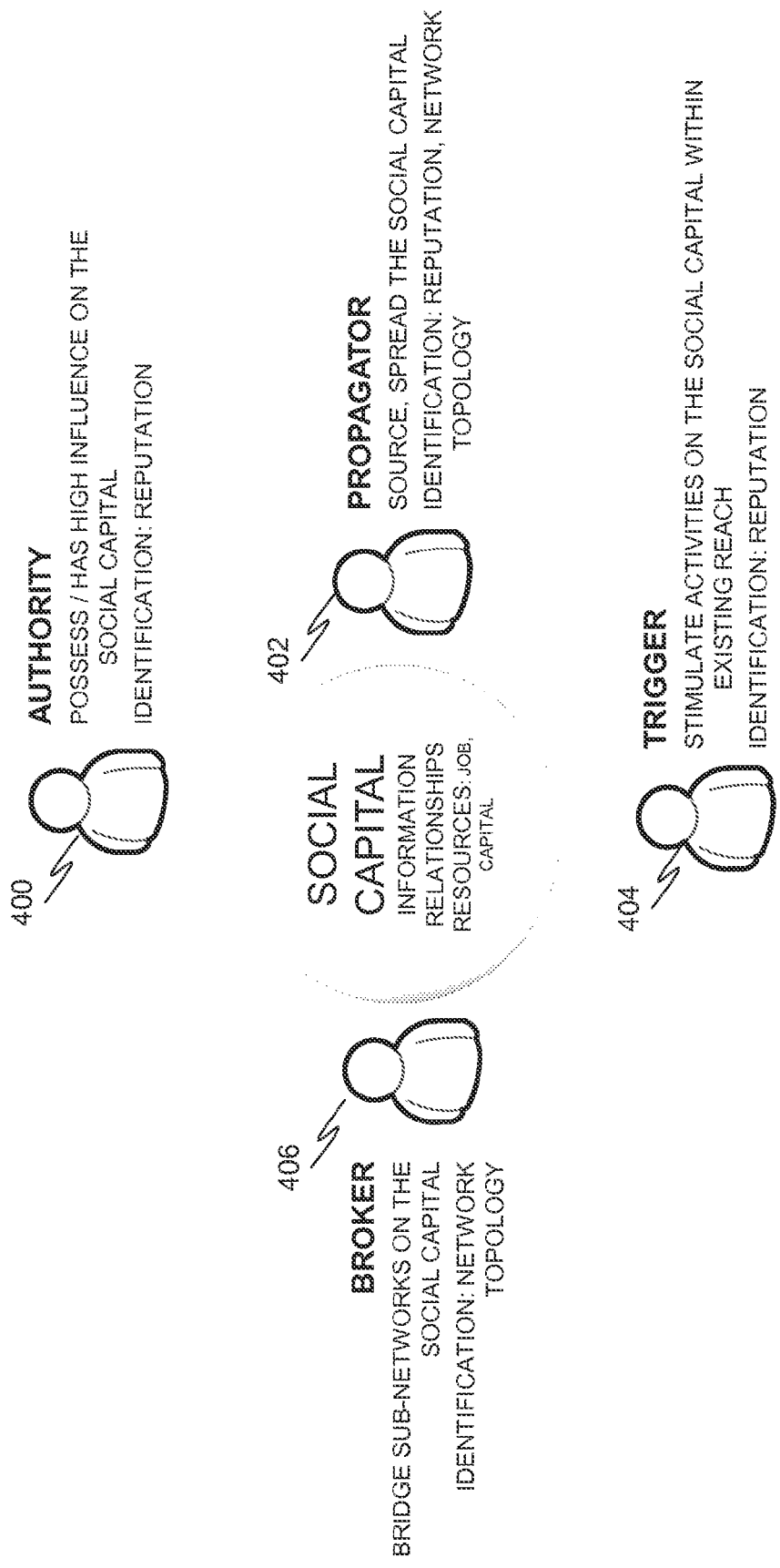
FIG. 4 is a diagram illustrating examples of member types and the mechanism or mechanisms that may be used to calculate social capital scores, in accordance with an example embodiment.

The first of these two mechanisms is to calculate a social capital score based on reputations. The second of these two mechanisms is to calculate a social capital score based on network topology. Either of these two mechanisms may be used individually, or the system may apply the two mechanisms on an alternative or combined basis depending on the type of member sought or the analysis being performed. FIG. 4 is a diagram illustrating examples of member types and the mechanism or mechanisms that may be used to calculate social capital scores, in accordance with an example embodiment. Social capital can generally be considered to be information, relationships, and/or resources (such as jobs or money). FIG. 4 depicts four different leadership archetypes. The first is an authority FIG. 400. An authority FIG. 400 possesses a high influence of social capital in general. The authority FIG. 400 may be, for example, an influencer having many followers and/or a senior leader of a reputable company in a particular space of interest. An authority FIG. 400 may be assigned a social capital score based on reputation. A propagator 402 may be the source of social capital and/or spread social capital. A propagator 402 may, for example, write an article in a particular field and/or share the article with a distribution list. A propagator 402 may be assigned a social capital score based on a combination of reputation and network topology. A trigger 404 may stimulate activities (such as posting a comment that triggers many polarizing discussions) or perform some other action that causes other members to get involved somehow. A trigger 404 may be assigned a social capital score based on reputation. A broker 406 may bridge sub-networks on the social capital. A broker 406 may, for example, encourage a connected member to adopt a topic. A broker 406 may be assigned a social capital score based on network topology.

Figure 5:
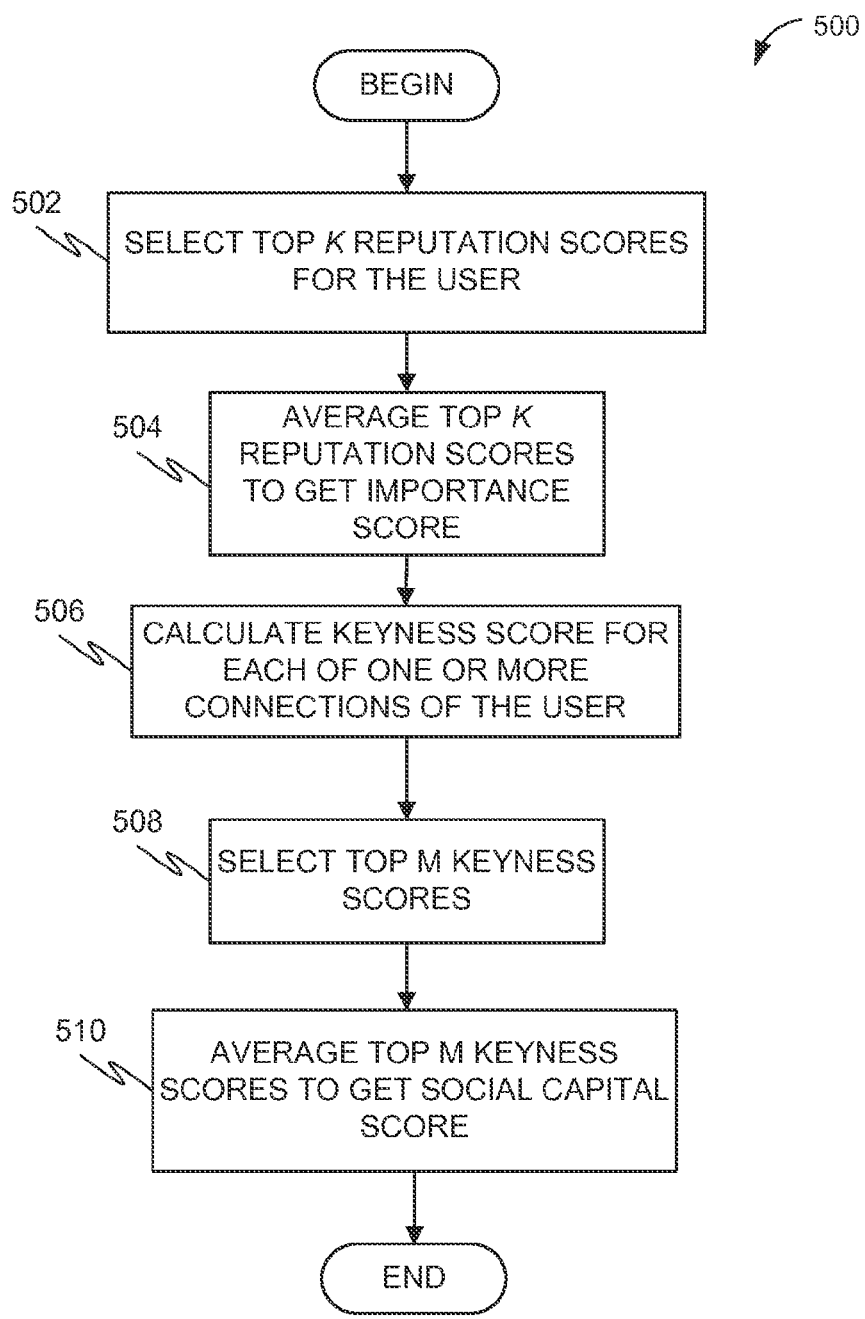
FIG. 5 is a flow diagram illustrating a method for calculating a social capital score for a member based on one or more reputation scores and/or network topology in accordance with an example embodiment.

FIG. 5 is a flow diagram illustrating a method 500 for calculating a social capital score for a member based on one or more reputation scores and/or network topology in accordance with an example embodiment. The process described in this figure basically combines the first and second mechanisms described above in a manner that allows the system to increase or decrease the weight of each. The process described in this figure assumes that the member has a plurality of skills and that each skill has been assigned a reputation score. At operation 502, the top k reputation scores for the member are selected. At operation 504, the top k reputation scores for the member are averaged. This average may be called an importance score. At this point the method 500 has derived a score indicating generally how important the member is. The method 500 may then proceed to calculate how important the members connected to the member are, under the assumption that if a member has important acquaintances, the member himself may have more social capital. At operation 506, a keyness score is calculated for each of one or more connections of the member. This keyness score provides an indication, either absolute or relative, of how "key" the connection is. In an example embodiment, the keyness score for a connection between member i and member j may be calculated according to the formula:

$$k_{ij}=c_{ij}*imp_j^\alpha$$

where k is the keyness score, c is a strength of a connection, imp is the importance score, which is raised to the power of constant α, which allows the importance score to be more important than the connection score. α may be fixed, but also could be selected dynamically based on whether or not member j is in a target market or some other factor. In another example embodiment c may be multiplied by a constant as well to weight the strength of the connection.

Connection strength (also known as edge score) is a way to weigh the strength of the bond between two nodes/members. Various signals can be examined and combined to derive the connection strength for a particular connection. The exact signals utilized and the weights applied to each are beyond the scope of this disclosure.

At operation 508, the top m key connections for the member are selected by choosing the connections of the member having the top nm keyness scores. At operation 510, the top m key connections for the member are averaged. This average may be assigned as the social capital score for the member.

As described above, in some example embodiments different social capital scores may be assigned to different aspects of a member account, such as personal versus career. This may be accomplished by, for example, filtering the reputation scores (by, for example, filtering out irrelevant skills) and/or filtering the connections (by, for example, filtering out connections irrelevant to the aspect being examined, such as filtering out personal connections if career is being examined).

The above method 500 may be implemented by a social capital computation component located, for example, in the recommendation engine 116 or otherwise in the application logic layer of the social network system 110 (e.g., on a server) of FIG. 1. Alternatively, it may be implemented on a client-side by a tool used to compare nodes in the social graph.

Example Data Structures

The following are example data structures that may be used to store the various pieces of information related to the social capital score and its calculation. Importance score may be stored in a data structure having the following fields:

| Importance Score | |
|---|---|
| member_id | the member under consideration |
| i_top5 | A measure of this person's overall visibility and expertise - the average of his/her k highest Reputation scores. These scores are roughly normally distributed with a mean of 100. Higher values indicating greater levels of importance and professional visibility. |
| Feature | Description |

Key connections may be stored in a data structure for every pair of members sharing a connection, the data structure having the following fields:

| Key Connections | |
|---|---|
| member_id | The member under consideration |
| alter_id | A connection of member_id |
| alter_imp_score | A measure of alter's overall importance, as defined above. |
| connstr | The connection strength between member and alter |
| k_top5_alpha | Ordering alters for a given member by this metric will give a ranked list of important people the member knows well. Defined as: alter_imp_score^1.5 * connstr |
| Feature | Description |

The Social Capital score may be stored in a data structure having the following fields:

| Social Capital | |
|---|---|
| member_id | the member under consideration |
| s_topk_alpha_mean10 | A measure of member's social capital - effectively a function of how many important people this person knows well. Defined as the average of member's ten largest key connection (k_topk_alpha) scores, as defined above. |
| Feature | Description |

Example Uses for the Social Network Scores

As described above, one possible use for the social capital scores is in recommending new connections to members. In such a case, the system may, for example, establish a threshold social capital score; if a member being considered for a connection has a social capital score above the threshold social capital score, the member being considered will be recommended. Of course, the social capital score may be only one factor that is used in determining whether or not to recommend a member as a connection, and other factors, such as shared connections, can also be used. In such combined-factor analyses, rather than a threshold, a weight may be applied to the social capital score.

Other possible uses will be described in this section. In one example embodiment, members may use a tool to compare other members in their social graph. This may be useful in situations, where, for example the member has a large number of connections and wishes to know whom to reach out to. In such an example embodiment, a direct comparison between members connected to the member can be performed. For example, member A may be connected to both member B and member C. Member A may then use the tool to determine if member B has more or less social capital than member C and if so, by how much. Here, the delta of social capital scores may be determined, such as $\Delta S = S_i - S_j$, where S is the social capital score.

In some example embodiments the social capital scores may be normalized based on the member's own social capital score. This reflects the fact that people tend to network at a level somewhere around their own level. For example, a nurse may often network with other nurses, doctors, or other professionals at around the same level, as opposed to networking with Fortune 500 CEOs or unemployed students.

In another example embodiment, the social capital score may be used to determine the probability that the member will click on or otherwise select an item presented on a screen. For example, the system may wish to determine whether to include a particular member's job change in a member feed. The social capital score may be used in this prediction to increase the likelihood that the member would care about that other member's job change enough to potentially click on the item when presented in a news feed.

In another example embodiment, the social capital score of key people at an organization may be used in making a mergers and acquisitions (M&A) analysis of whether or not to acquire the organization. This may be especially relevant if the organization is one that relies heavily on social capital, such as a marketing firm or sales organization.

In another example embodiment, the social capital scores are used in presenting a mapping of a member's connections, perhaps highlighting nodes of members having high social capital scores.

Example Mobile Device

Figure 6:
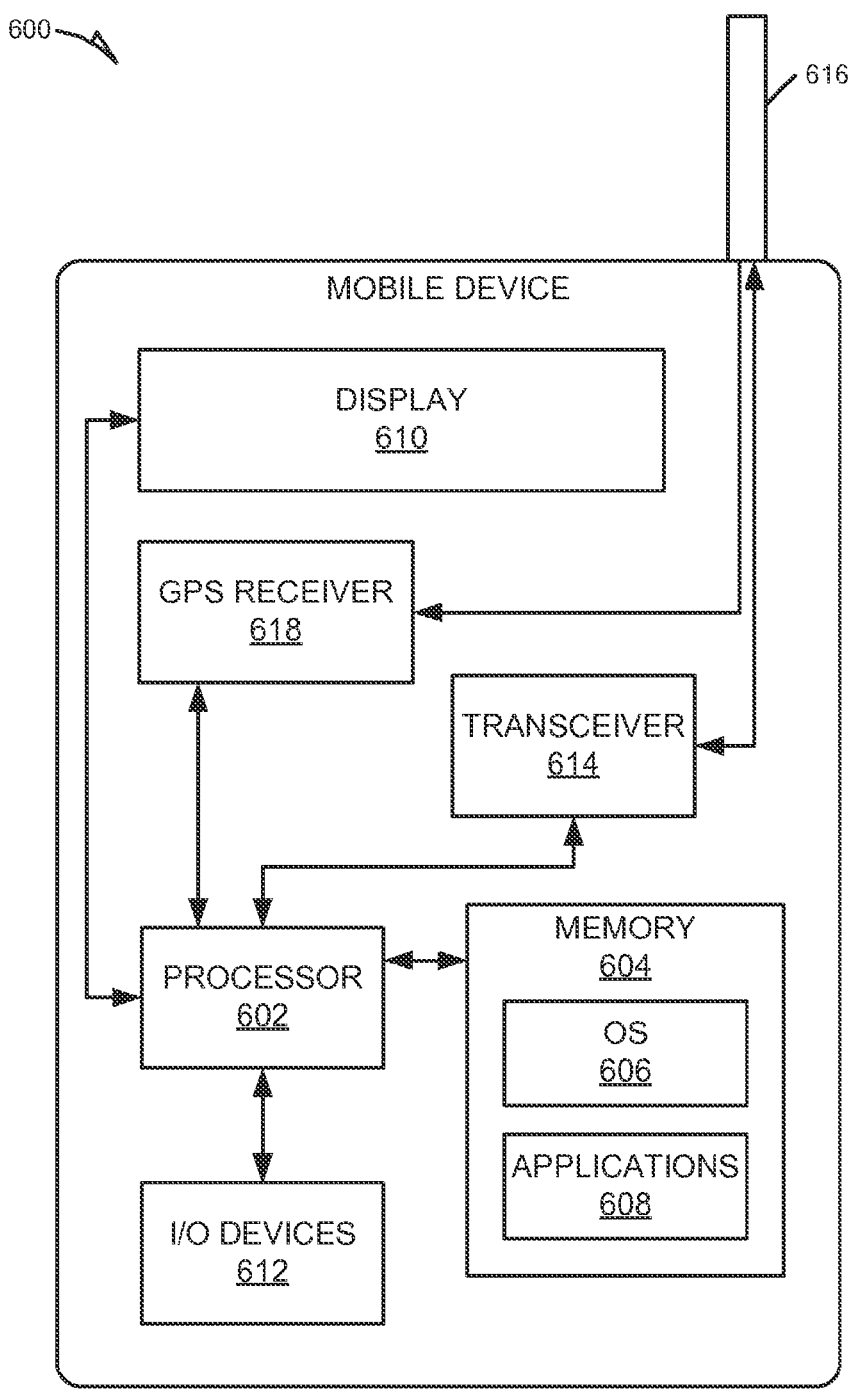
FIG. 6 is a block diagram illustrating a mobile device, according to an example embodiment.

FIG. 6 is a block diagram illustrating a mobile device 600, according to an example embodiment. The mobile device 600 can include a processor 602. The processor 602 can be any of a variety of different types of commercially available processors 602 suitable for mobile devices 600 (for example, an XScale architecture microprocessor, a microprocessor without interlocked pipeline stages (MIPS) architecture processor, or another type of processor 602). A memory 604, such as a random access memory (RAM), a flash memory, or another type of memory, is typically accessible to the processor 602. The memory 604 can be adapted to store an operating system (OS) 606, as well as application programs 608. The processor 602 can be coupled, either directly or via appropriate intermediary hardware, to a display 610 and to one or more input/output (I/O) devices 612, such as a keypad, a touch panel sensor, a microphone, and the like. Similarly, in some embodiments, the processor 602 can be coupled to a transceiver 614 that interfaces with an antenna 616. The transceiver 614 can be configured to both transmit and receive cellular network signals, wireless data signals, or other types of signals via the antenna 616, depending on the nature of the mobile device 600. Further, in some configurations, a GPS receiver 618 can also make use of the antenna 616 to receive GPS signals.

Modules, Components, and Logic

Certain embodiments are described herein as including logic or a number of components, modules, or mechanisms. Modules can constitute either software modules (e.g., code embodied (1) on a non-transitory machine-readable medium or (2) in a transmission signal) or hardware-implemented modules. A hardware-implemented module is a tangible unit capable of performing certain operations and can be configured or arranged in a certain manner. In example embodiments, one or more computer systems (e.g., a standalone, client, or server computer system) or one or more processors 602 can be configured by software (e.g., an application or application portion) as a hardware-implemented module that operates to perform certain operations as described herein.

In various embodiments, a hardware-implemented module can be implemented mechanically or electronically. For example, a hardware-implemented module can comprise dedicated circuitry or logic that is permanently configured (e.g., as a special-purpose processor, such as a field programmable gate array (FPGA) or an application-specific integrated circuit (ASIC)) to perform certain operations. A hardware-implemented module can also comprise programmable logic or circuitry (e.g., as encompassed within a general-purpose processor 602 or other programmable processor 602) that is temporarily configured by software to perform certain operations. It will be appreciated that the decision to implement a hardware-implemented module mechanically, in dedicated and permanently configured circuitry, or in temporarily configured circuitry (e.g., configured by software) can be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor 602 configured using software, the general-purpose processor 602 can be configured as different hardware-implemented modules at different times. Software can accordingly configure a processor 602, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules can be regarded as being communicatively coupled. Where multiple of such hardware-implemented modules exist contemporaneously, communications can be achieved through signal transmission (e.g., over appropriate circuits and buses that connect the hardware-implemented modules). In embodiments in which multiple hardware-implemented modules are configured or instantiated at different times, communications between such hardware-implemented modules can be achieved, for example, through the storage and retrieval of information in memory structures to which the multiple hardware-implemented modules have access. For example, one hardware-implemented module can perform an operation, and store the output of that operation in a memory device to which it is communicatively coupled. A further hardware-implemented module can then, at a later time, access the memory device to retrieve and process the stored output. Hardware-implemented modules can also initiate communications with input or output devices, and can operate on a resource (e.g., a collection of information).

The various operations of example methods described herein can be performed, at least partially, by one or more processors 602 that are temporarily configured (e.g., by software) or permanently configured to perform the relevant operations. Whether temporarily or permanently configured, such processors 602 can constitute processor-implemented modules that operate to perform one or more operations or functions. The modules referred to herein can, in some example embodiments, comprise processor-implemented modules.

Similarly, the methods described herein can be at least partially processor-implemented. For example, at least some of the operations of a method can be performed by one or more processors 602 or processor-implemented modules. The performance of certain of the operations can be distributed among the one or more processors 602, not only residing within a single machine, but deployed across a number of machines. In some example embodiments, the processor 602 or processors 602 can be located in a single location (e.g., within a home environment, an office environment, or a server farm), while in other embodiments, the processors 602 can be distributed across a number of locations.

The one or more processors 602 can also operate to support performance of the relevant operations in a "cloud computing" environment or as a "software as a service" (SaaS). For example, at least some of the operations can be performed by a group of computers (as examples of machines including processors 602), these operations being accessible via a network (e.g., the Internet) and via one or more appropriate interfaces (e.g., application program interfaces (APIs)).

Electronic Apparatus and System

Example embodiments can be implemented in digital electronic circuitry, in computer hardware, firmware, or software, or in combinations of them. Example embodiments can be implemented using a computer program product, e.g., a computer program tangibly embodied in an information carrier, e.g., in a machine-readable medium for execution by, or to control the operation of, data processing apparatus, e.g., a programmable processor 602, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations can be performed by one or more programmable processors 602 executing a computer program to perform functions by operating on input data and generating output. Method operations can also be performed by, and apparatus of example embodiments can be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor 602), or in a combination of permanently and temporarily configured hardware can be a design choice. Below are set out hardware (e.g., machine) and software architectures that can be deployed, in various example embodiments.

Example Machine Architecture and Machine-Readable Medium

Figure 7:
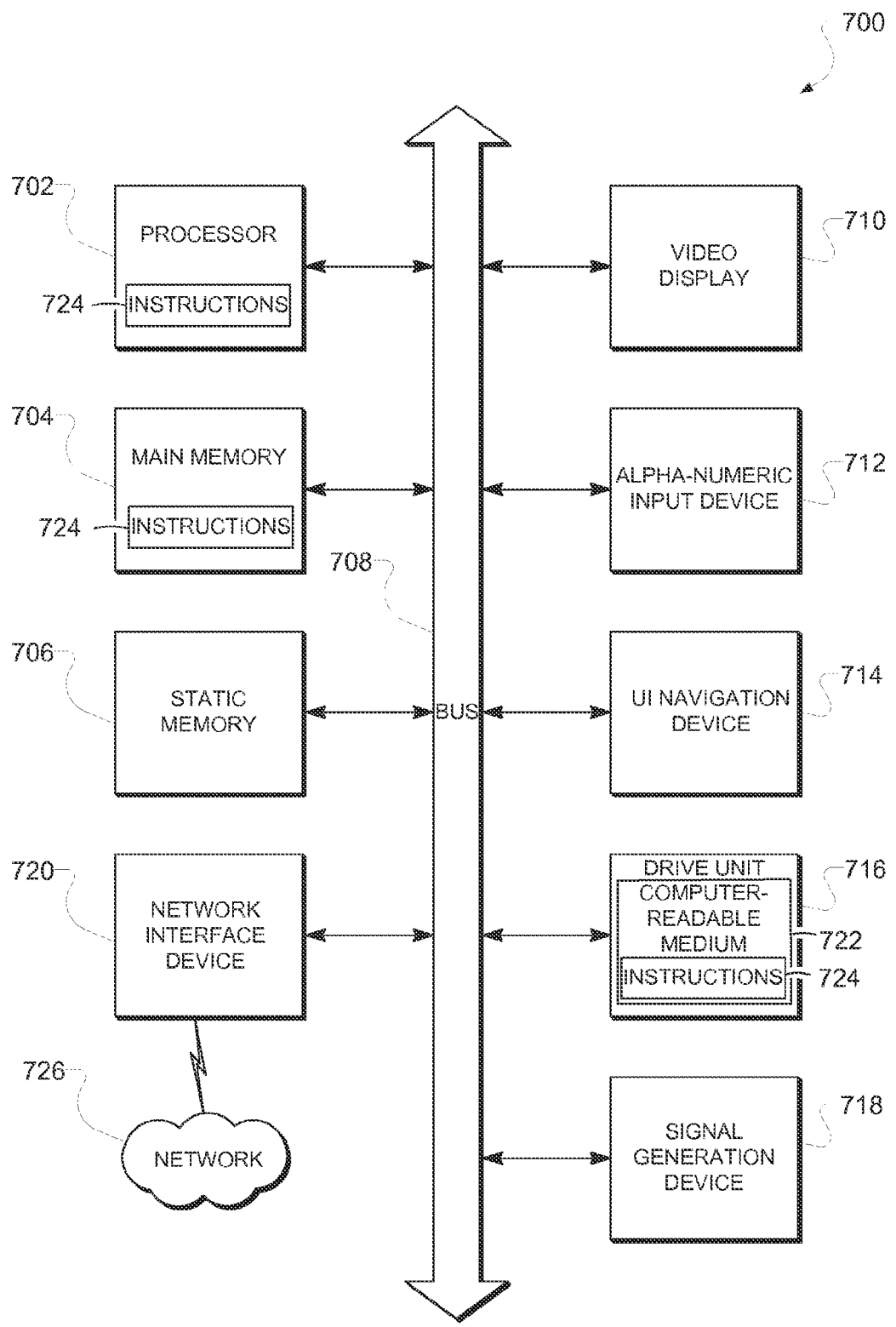
FIG. 7 is a block diagram of machine in the example form of a computer system within which instructions can be executed for causing the machine to perform any one or more of the methodologies discussed herein.

FIG. 7 is a block diagram of machine in the example form of a computer system 700 within which instructions 724 can be executed for causing the machine to perform any one or more of the methodologies discussed herein. In alternative embodiments, the machine operates as a standalone device or can be connected (e.g., networked) to other machines. In a networked deployment, the machine can operate in the capacity of a server or a client machine in server-client network environment, or as a peer machine in a peer-to-peer (or distributed) network environment. The machine can be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a CPU, a graphics processing unit (GPU), or both), a main memory 704 and a static memory 706, which communicate with each other via a bus 708. The computer system 700 can further include a video display 710 (e.g., a liquid crystal display (LCD) or a cathode ray tube (CRT)). The computer system 700 also includes an alphanumeric input device 712 (e.g., a keyboard or a touch-sensitive display screen), a cursor control (or UI navigation) device 714 (e.g., a mouse), a drive unit 716, a signal generation device 718 (e.g., a speaker), and a network interface device 720.

Machine-Readable Medium

The drive unit 716 includes a machine-readable medium 722 on which is stored one or more sets of instructions (e.g., software) 724 embodying or utilized by any one or more of the methodologies or functions described herein. The instructions 724 can also reside, completely or at least partially, within the main memory 704 and/or within the processor 702 during execution thereof by the computer system 700, the main memory 704 and the processor 702 also constituting machine-readable media.

While the machine-readable medium 722 is shown in an example embodiment to be a single medium, the term "machine-readable medium" can include a single medium or multiple media (e.g., a centralized or distributed database, and/or associated caches and servers) that store the one or more instructions 724 or data structures. The term "machine-readable medium" shall also be taken to include any tangible medium that is capable of storing, encoding, or carrying instructions 724 for execution by the machine and that cause the machine to perform any one or more of the methodologies of the present disclosure, or that is capable of storing, encoding, or carrying data structures utilized by or associated with such instructions 724. The term "machine-readable medium" shall accordingly be taken to include, but not be limited to, solid-state memories, and optical and magnetic media. Specific examples of machine-readable media 722 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 724 can further be transmitted or received over a communications network 726 using a transmission medium. The instructions 724 can be transmitted using the network interface device 720 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 724 for execution by the machine, and includes digital or analog communications signals or other intangible media to facilitate communication of such software.

Although the inventive subject matter has been described with reference to specific example embodiments, it will be evident that various modifications and changes can be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter can be practiced. The embodiments illustrated are described in sufficient detail to enable those skilled in the art to practice the teachings disclosed herein. Other embodiments can be utilized and derived therefrom, such that structural and logical substitutions and changes can be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter can be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose can be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method comprising:

for each of a group of nodes in a social graph stored in a computer memory, the group of nodes including a node corresponding to a first member and a plurality of nodes corresponding to members with which the first member is directly connected in the social graph:

identifying a plurality of reputation scores for a node in the social graph stored in the computer memory, each of the plurality of reputation scores corresponding with a different skill of a member corresponding to the node; and averaging the plurality of reputation scores for the node into an importance score for the node;

calculating a keyness score for each of the plurality of nodes corresponding to members with which the first member is directly connected in the social graph, the keyness score for each of the plurality of nodes being based on a connection strength for a connection between the node of the plurality of nodes corresponding to members with which the first member is directly connected in the social graph and the node corresponding to the first member and based on the importance score for the node;

selecting a subset of the keyness scores;

averaging the keyness scores in the subset of keyness scores;

saving the average of the keyness scores as a social capital score, associated with the node corresponding to the first member, in the computer memory; and displaying the social capital score for the first member in a tool that compares social capital scores between members connected to a second member in the social graph.

2. The computer-implemented method of claim 1, wherein the identifying includes ranking the plurality of reputation scores for the node and selecting top k reputation scores.

3. The computer-implemented method of claim 1, wherein the calculating includes applying the formula $$k_{ij} = c_{ij} * imp_j^\alpha$$

where k is the keyness score, c is a connection strength, imp is the importance score, and $\alpha$ is a constant.

4. The computer-implemented method of claim 1, further comprising utilizing the social capital score for the first member in determining whether to recommend the first member as a possible connection for a second member.

5. The computer-implemented method of claim 1, wherein the tool compares social capital scores by subtracting the social capital score for the first member from a social capital score for a third member.

6. The computer-implemented method of claim 1, wherein the tool normalizes the social capital score for the first member based on a social capital score for the second member.

7. The computer-implemented method of claim 1, wherein the social capital score for the first member is used to determine a probability that a member will click on or otherwise select an item associated with the first member.

8. The computer-implemented method of claim 1, wherein the social capital score is presented graphically by highlighting connections to members having high social capital scores in a graphical representation of the social graph.

9. A system comprising:

one or more processors, and a computer-readable medium having instructions stored thereon, the instructions executed by the one or more processors, cause the system to:

for each of a group of nodes in a social graph stored in a computer memory, the group of nodes including a node corresponding to a first member and a plurality of nodes corresponding to members with which the first member is directly connected in the social graph:

identify a plurality of reputation scores for a node in the social graph stored in the computer memory, each of the plurality of reputation scores corresponding with a different skill of a member corresponding to the node; and average the plurality of reputation scores for the node into an importance score for the node;

calculate a keyness score for each of the plurality of nodes corresponding to members with which the first member is directly connected in the social graph, the keyness score for each of the plurality of nodes being based on a connection strength for a connection between the node of the plurality of nodes corresponding to members with which the first member is directly connected in the social graph and the node corresponding to the first member and based on the importance score for the node;

select a subset of the keyness scores;

average the keyness scores in the subset of keyness scores;

save the average of the keyness scores as a social capital score, associated with the node corresponding to the first member, in the computer memory; and display the social capital score for the first member in a tool that compares social capital scores between members connected to a second member in the social graph.

10. The system of claim 9, wherein the instructions are executed by a recommendation module.

11. The system of claim 9, wherein instructions are executed by an application logic layer of a social network system server.

12. A non-transitory computer-readable medium storing executable instructions thereon, which, when executed by a processor, cause the processor to perform operations comprising:

for each of a group of nodes in a social graph stored in a computer memory, the group of nodes including a node corresponding to a first member and a plurality of nodes corresponding to members with which the first member is directly connected in the social graph:

identifying a plurality of reputation scores for a node in the social graph stored in the computer memory, each of the plurality of reputation scores corresponding with a different skill of a member corresponding to the node; and averaging the plurality of reputation scores for the node into an importance score for the node;

calculating a keyness score for each of the plurality of nodes corresponding to members with which the first member is directly connected in the social graph, the keyness score for each of the plurality of nodes being based on a connection strength for a connection between the node of the plurality of nodes corresponding to members with which the first member is directly connected in the social graph and the node corresponding to the first member and based on the importance score for the node;
selecting a subset of the keyness scores;
averaging the keyness scores in the subset of keyness scores;
saving the average of the keyness scores as a social capital score, associated with the node corresponding to the first member, in the computer memory; and
displaying the social capital score for the first member in a tool that compares social capital scores between members connected to a second member in the social graph.

13. The non-transitory computer-readable medium of claim 12, wherein the identifying includes ranking a plurality of reputation scores for the node and selecting top k reputation scores.

14. The non-transitory computer-readable medium of claim 12, wherein the calculating includes applying the formula $$k_{ij}=c_{ij}*imp_j^\alpha$$

where k is the keyness score, c is a connection strength, imp is the importance score, and $\alpha$ is a constant.

15. The non-transitory computer-readable medium of claim 12, further comprising utilizing the social capital score for the first member in determining whether to recommend the first member as a possible connection for a second member.

16. The non-transitory computer-readable medium of claim 12, wherein the tool compares social capital scores by subtracting the social capital score for the first member from a social capital score for a third member.

17. The non-transitory computer-readable medium of claim 12, wherein the tool normalizes the social capital score for the first member based on a social capital score for the second member.

18. The non-transitory computer-readable medium of claim 12, wherein the social capital score for the first member is used to determine a probability that a member will click on or otherwise select an item associated with the first member.

* * * * *